Jan. 31, 1956   L. B. POPE ET AL   2,732,617
METHOD OF MAKING AN INTERCHANGEABLE EXTENSION ARBOR
Filed June 20, 1952
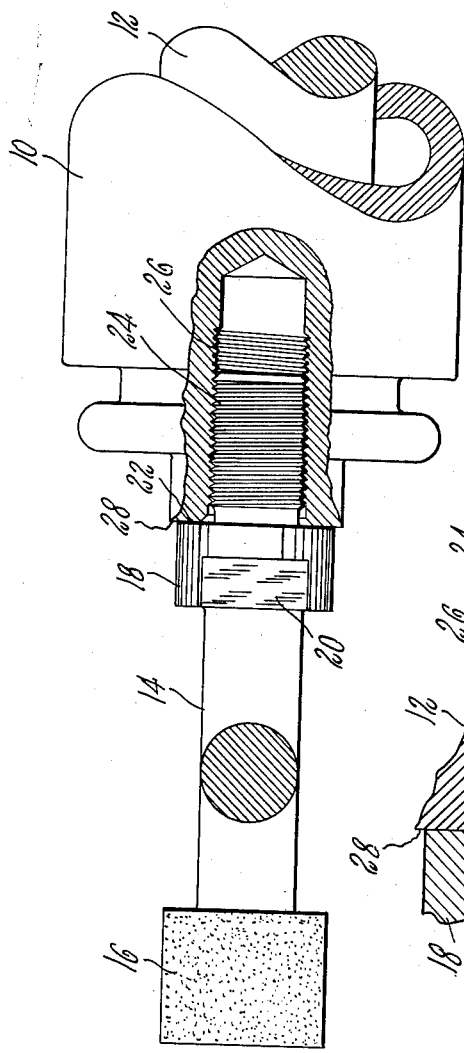
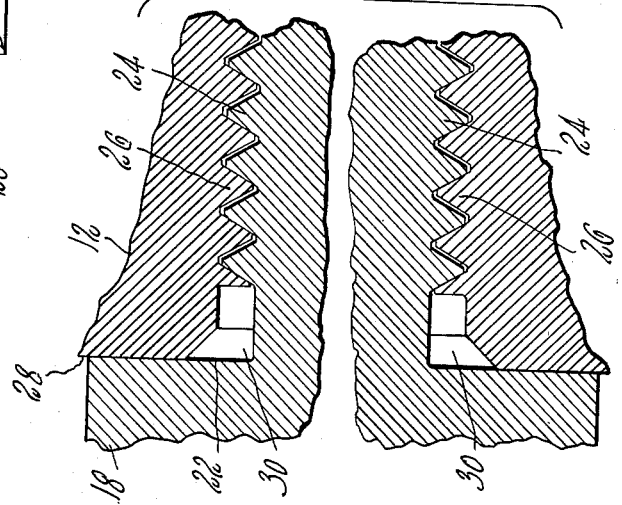
Inventors
Lyman B. Pope
John W. Sjostrom
by Wright, Brown, Quinby & May
Attys.

United States Patent Office 2,732,617
Patented Jan. 31, 1956

2,732,617

METHOD OF MAKING AN INTERCHANGEABLE EXTENSION ARBOR

Lyman B. Pope, Kingston, and John W. Sjostrom, Salem, N. H., assignors to Pope Machinery Corporation, Haverhill, Mass., a corporation of Massachusetts Application June 20, 1952, Serial No. 294,742

1 Claim. (Cl. 29—406)

This invention relates to a method of making interchangeable extension arbors used in machine tool spindles. It relates especially to a method of making internal grinding machines in the spindles of which it is regular practice to insert extension arbors of various lengths as required by the depth of the hole being ground.

It is a requirement that these arbors be easy to insert, that they run true within close tolerances and that they be removable without undue sticking.

Arbors have been made with a thread and a cylindrical piloting portion between the thread and a shoulder adapted to engage a mating shoulder on the spindle nose when the arbor was tightened in place. The corresponding female thread was necessarily positioned so deeply within the spindle nose that it was difficult to machine with sufficient accuracy to avoid some eccentricity between the pilot bore and the thread. The pilot must have clearance in the spindle bore. This clearance is necessarily greater than the permissible run-out of the arbor and it increases with natural wear. Any eccentricity between the pilot bore and the thread in the spindle nose will cause the arbor to move off center, often to the limit provided by the clearance between the pilot and the pilot bore.

Other arbors have been made having a male taper with a threaded projection extending out from the small end of the tapered portion for engagement with a female thread positioned just beyond a matching tapered hole in the spindle. These connections are difficult and expensive to manufacture if the mating tapers are held within the required tolerances for precision work. The female thread, deep in the spindle hole, must be made with a tap with the result that it is often slightly eccentric with the axis of the taper thus preventing a proper seating of the arbor. In regular factory use it is especially difficult to clean the tapered hole properly when assembling. Another fault is the possibility of seizing to such an extent that the parts are damaged or even destroyed in the process of being disassembled. This is especially likely to happen if a cold arbor is screwed into a warm spindle.

Objects of this invention are to effect a substantial reduction in the cost of manufacture; to create a design such that the mating surfaces are exposed and are thus easy to manufacture with required accuracy and easy to clean when assembling; to provide for a female thread in the spindle that is relatively large and positioned near the open end of the spindle bore so that the thread can be generated therein with a single point tool; and to thus provide mating surfaces and threads of such character and in such arrangement that true centering of the arbor may be had and that danger of seizure is practically eliminated.

In this invention use is made of the centering action of the angular flanks of a V-thread. We have found that in assembling an arbor with a cylindrical threaded shank and a spindle having a corresponding threaded bore the inclined surfaces of the V-thread bring the arbor toward the true center of the spindle bore at the first contact of the mating shoulders on the arbor and the spindle nose. Then as the tightening is completed, these same inclined surfaces center the arbor within closed tolerances than can be had with the prior art designs. The threaded shank and bore are made with as large diameters as the structure permits. Since the female thread, which is the element most difficult to produce accurately, is large in diameter and is positioned adjacent the orifice of the bore in the spindle nose, it can be generated with a single point tool, thus providing for true centralization.

These and other features of the invention will be best understood from the following description and drawing of a preferred embodiment thereof in which—

Figure 1 is a view partly in cross section of an extension arbor in operating position in a spindle; and Figure 2 is a fragmentary sectional view, on a larger scale, of the engaging surfaces of the spindle and arbor.

The spindle shown in the drawing is the cartridge type of internal grinding spindle which comprises a housing 10, a shaft 12 and bearings, not shown, supporting the shaft in the housing in the usual well understood manner.

An extension arbor 14 carries an abrasive wheel 16 and has an enlarged portion 18 with wrench flats 20 and a shoulder 22 which is in a plane perpendicular to the axis of the arbor. This enlarged portion is between the wheel 16 and a threaded end portion 24. The latter has a standard V-thread adapted to engage a mating thread 26 cut in the nose of the shaft 12. At the extremity of the shaft is a shoulder 28 in a plane perpendicular to the axis of the shaft and hence adapted to abut the shoulder 22 on the arbor in face to face contact. The edge of the orifice at the end of the shaft is preferably relieved, as at 30, so that firm interengagement of the shoulders 22 and 28 will not be hindered by any small quanity of dirt which may lodge in the angle between the shoulder 22 and the threaded portion 26 of the extension arbor.

We have found that at the first contact of the mating shoulders 22 and 28 the arbor is centered by the camming action of the V-threads more accurately than by any of the standard methods we have used. Furthermore, we have found that no sticking or seizing ever occurs with this new construction.

We claim:

A method of centering an extension arbor relatively to a spindle shaft which comprises forming on an end portion of an extension arbor a screw-thread of the V type accurately coaxial therewith and a shoulder adjacent to said end portion in a plane perpendicular to the axis of the extension arbor, forming a screw-threaded bore in an end of said shaft with a thread accurately coaxial with the shaft and adapted to mate with the threaded portion of the arbor, relieving the orifice of said bore, forming a shoulder at said end of the shaft in a plane perpendicular to the axis of the shaft, screwing the threaded end of the extension arbor into said bore until said shoulders abut each other, then applying considerable torque to the extension arbor to press the shoulders tightly against each other, whereby the extension arbor is accurately centered by the mutual camming action of the thread flanks.

References Cited in the file of this patent

UNITED STATES PATENTS

| | | |
|---|---|---|
| 528,167 | Jones | Oct. 30, 1894 |
| 1,077,931 | Hahn | Nov. 4, 1913 |
| 1,163,156 | Johnson | Dec. 7, 1915 |
| 1,477,855 | Thurston | Dec. 18, 1923 |
| 1,580,968 | Brazza | Apr. 13, 1926 |
| 2,133,232 | Streby | Oct. 11, 1938 |
| 2,638,721 | Sunnen | May 19, 1953 |